US007482402B2

(12) United States Patent
Lustiger et al.

(10) Patent No.: US 7,482,402 B2
(45) Date of Patent: *Jan. 27, 2009

(54) FIBER REINFORCED POLYPROPYLENE COMPOSITIONS

(75) Inventors: Arnold Lustiger, Edison, NJ (US);
Jeffrey Valentage, Royal Oak, MI (US);
Walter T. Matuszek, Easton, PA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 207 days.

This patent is subject to a terminal disclaimer.

(21) Appl. No.: 11/301,533

(22) Filed: Dec. 13, 2005

(65) Prior Publication Data

US 2006/0264543 A1 Nov. 23, 2006

Related U.S. Application Data

(60) Provisional application No. 60/681,609, filed on May 17, 2005.

(51) Int. Cl.
*C08L 23/10* (2006.01)
*C08L 67/02* (2006.01)
*C08K 3/34* (2006.01)

(52) U.S. Cl. .................. 524/513; 524/502; 524/582; 524/583; 524/451; 524/445; 524/425; 524/449; 524/423; 524/436; 524/492; 524/497; 524/528; 524/522

(58) Field of Classification Search ........... 524/451, 524/582, 583, 584, 490, 445, 513, 528, 522; 525/190, 185, 184, 178
See application file for complete search history.

(56) References Cited

U.S. PATENT DOCUMENTS

| | | | |
|---|---|---|---|
| 3,304,282 A | 2/1967 | Cadus et al. | |
| 3,639,424 A * | 2/1972 | Gray, Jr. et al. | ............. 525/177 |
| 4,549,920 A | 10/1985 | Cogswell et al. | |
| 4,559,262 A | 12/1985 | Cogswell et al. | |
| 4,708,623 A | 11/1987 | Aoki et al. | |
| 4,752,526 A * | 6/1988 | Daimon et al. | ............. 428/332 |
| 4,987,172 A | 1/1991 | Higashitsuji et al. | |
| 5,019,450 A | 5/1991 | Cogswell et al. | |
| 5,106,665 A * | 4/1992 | Akao et al. | ............. 428/36.92 |
| 5,130,193 A | 7/1992 | Ikeda | |
| 5,145,891 A | 9/1992 | Yasukawa et al. | |
| 5,145,892 A * | 9/1992 | Yasukawa et al. | ............. 524/34 |
| 5,213,889 A | 5/1993 | Cogswell et al. | |
| 5,316,834 A | 5/1994 | Matsuda et al. | |
| 5,321,071 A | 6/1994 | Fujisawa et al. | |
| 5,401,154 A | 3/1995 | Sargent | |
| 5,447,793 A | 9/1995 | Montsinger | |
| 5,520,867 A | 5/1996 | Shirai et al. | |
| 5,541,238 A | 7/1996 | Yamada et al. | |
| 5,595,696 A | 1/1997 | Schlarb et al. | |
| 5,627,226 A * | 5/1997 | Lustiger et al. | ............... 524/90 |
| 5,679,456 A | 10/1997 | Sakai et al. | |
| 5,750,616 A * | 5/1998 | Shimpuku et al. | ........... 524/496 |
| 5,824,410 A | 10/1998 | Sakai et al. | |
| 6,037,056 A | 3/2000 | Macdonald et al. | |
| 6,060,010 A | 5/2000 | Sakai et al. | |
| 6,284,831 B1 * | 9/2001 | Shimpuku et al. | ........... 524/494 |
| 6,358,626 B1 | 3/2002 | Persson et al. | |
| 6,395,342 B1 * | 5/2002 | Kadowaki et al. | ........ 427/434.2 |
| 6,419,864 B1 | 7/2002 | Scheuring et al. | |
| 6,428,728 B1 | 8/2002 | Sakai et al. | |
| 6,627,701 B2 | 9/2003 | Adedeji et al. | |
| 6,683,125 B1 * | 1/2004 | Augestad et al. | ............. 524/490 |
| 6,750,286 B1 | 6/2004 | Schwarte et al. | |
| 6,908,573 B2 | 6/2005 | Hossan | |
| 6,908,964 B2 | 6/2005 | Adedeji et al. | |
| 7,022,751 B2 | 4/2006 | Zhang et al. | |
| 2002/0007900 A1 | 1/2002 | Keller | |
| 2003/0114575 A1 | 6/2003 | Teutsch | |
| 2003/0164577 A1 | 9/2003 | Kieltyka et al. | |
| 2004/0043206 A1 | 3/2004 | Bush et al. | |
| 2004/0209977 A1 | 10/2004 | Hossan | |
| 2004/0241332 A1 | 12/2004 | Kreis et al. | |

(Continued)

FOREIGN PATENT DOCUMENTS

DE 19616672 10/1997

(Continued)

OTHER PUBLICATIONS

JP 58-222132 (Feb. 1983) abstract in English.*

(Continued)

*Primary Examiner*—Vasu Jagannathan
*Assistant Examiner*—Rip A. Lee
(74) *Attorney, Agent, or Firm*—Robert A. Migliorini

(57) ABSTRACT

The present invention is directed generally to fiber reinforced polypropylene compositions, and the beneficial mechanical properties imparted by such compositions. The fiber reinforced polypropylene compositions include at least 25 wt % polypropylene based polymer, from 5 to 60 wt % organic fiber, and from 0 to 60 wt % inorganic filler. Lubricant may also be optionally incorporated into the composition. Articles molded from these fiber reinforced polypropylene compositions have a flexural modulus of at least 300,000 psi, and exhibit ductility during instrumented impact testing. The fiber reinforced polypropylene compositions of the present invention are particularly suitable for making molded articles including, but not limited to household appliances, automotive parts, and boat hulls.

46 Claims, No Drawings

U.S. PATENT DOCUMENTS

| | | |
|---|---|---|
| 2005/0058822 A1 | 3/2005 | Ittel |
| 2005/0202223 A1 | 9/2005 | Harima et al. |
| 2006/0261508 A1 | 11/2006 | Lustiger et al. |
| 2006/0261509 A1 | 11/2006 | Lustiger et al. |
| 2006/0263529 A1 | 11/2006 | Lustiger et al. |
| 2006/0264544 A1 | 11/2006 | Lustiger et al. |
| 2006/0264555 A1 | 11/2006 | Lustiger et al. |
| 2006/0264556 A1 | 11/2006 | Lustiger et al. |
| 2006/0264557 A1 | 11/2006 | Lustiger et al. |

FOREIGN PATENT DOCUMENTS

| | | |
|---|---|---|
| DE | 19822051 | 9/1999 |
| DE | 19831124 | 1/2000 |
| DE | 199 34 377 A1 * | 1/2001 |
| DE | 201 04 584 U1 | 7/2002 |
| DE | 19934377 | 12/2002 |
| DE | 10229298 | 1/2004 |
| EP | 0 397 881 A1 | 11/1990 |
| EP | 0 232522 B1 | 8/1991 |
| EP | 0 056 703 B2 | 5/1992 |
| EP | 0 644 085 A1 | 3/1995 |
| EP | 0 669 372 A1 | 8/1995 |
| EP | 787573 | 8/1997 |
| EP | 0 967240 A2 | 12/1999 |
| EP | 1075918 A1 | 2/2001 |
| EP | 0 635542 B1 | 1/2002 |
| EP | 1 234 853 A1 | 8/2002 |
| GB | 1092840 | 11/1967 |
| JP | 1980 80448 | 6/1980 |
| JP | 82017688 | 4/1982 |
| JP | 57 180648 | 11/1982 |
| JP | 58-222132 * | 2/1983 |
| JP | 60239220 | 11/1985 |
| JP | 61019662 | 1/1986 |
| JP | 63027550 | 2/1988 |
| JP | 1087220 | 3/1989 |
| JP | 1-104636 * | 4/1989 |
| JP | 1989 104636 | 4/1989 |
| JP | 1989 167370 | 7/1989 |
| JP | 1-218825 | 9/1989 |
| JP | 1989 225647 | 9/1989 |
| JP | 3047711 | 2/1991 |
| JP | 3-290453 * | 12/1991 |
| JP | 1991 290453 | 12/1991 |
| JP | 2935893 B2 | 7/1992 |
| JP | 3454481 B2 | 8/1994 |
| JP | 1995-62167 | 3/1995 |
| JP | 08 118389 | 5/1996 |
| JP | 1996151483 A | 6/1996 |
| JP | A 9003337 | 7/1997 |
| JP | 63-27550 * | 2/1998 |
| JP | 11 099519 | 4/1999 |
| JP | 2001 220517 | 8/2001 |
| JP | 2002060502 A | 2/2002 |
| JP | 2004 123914 | 4/2004 |
| JP | 2005144678 A | 6/2005 |
| NL | 1009216 | 11/1999 |
| WO | WO 9005164 | 5/1990 |
| WO | WO 98/30382 | 7/1998 |
| WO | WO 99/51425 | 10/1999 |
| WO | WO 02/53629 A1 * | 7/2002 |
| WO | WO 02/053629 A1 | 7/2002 |
| WO | WO 02053629 | 7/2002 |
| WO | WO 03/092984 | 4/2003 |
| WO | WO 03057453 | 9/2003 |
| WO | WO 2005/009721 A1 | 2/2005 |

OTHER PUBLICATIONS

Ruch, Jr. et al., Compounding and Characterisation of Long Fibre Reinforced Composites Based on Flax and Polypropylene, Annual Technical Conf., Soc. Of Plastics Eng. (2002).

Lopes, et al., Effect of extruder compounding conditions of mechanical properties of polypropylene/glass fiber composites, Polimeros: Ciencia e Tecnologia (1999) 9(1) pp. 85-96.

Ria/Polymers GmbH—Tested for bending and breaking . . . an int'l innovation—PET fibers in PP compounds, Jul. 7, 2003, Germany.

Ruch, et al., "Innovative Direktverarbeitung von Naturfasern" Kunststoffe, Carl Hanser Verlag, Munchen, vol. 92, No. 2, 2002, pp. 28-34.

Die Kommende Werkstoffgruppe—Kunststoffe, Carl Hanser Verlag, Munchen, De, No. 3, Mar. 1, 2005, pp. 23-28.

Wobbe et al, Spritzgießen inklusive Compoundieren,—Injection Moulding That Includes Compounding, Kunststoffe, Carl Hanser Verlag, Munchen, De, vol. 88, No. 10, Oct. 1998, pp. 1832, 1834, 1836, 1838.

* cited by examiner

FIBER REINFORCED POLYPROPYLENE COMPOSITIONS

CROSS-REFERENCE TO RELATED APPLICATION

This application claims the benefit of U.S. Provisional Application No. 60/681,609 filed May 17, 2005.

FIELD OF THE INVENTION

The present invention is directed generally to articles made from fiber reinforced polypropylene compositions having a flexural modulus of at least 300,000 psi and exhibiting ductility during instrumented impact testing. The present invention is also directed to processes for making such articles: It more particularly relates to advantageous fiber reinforced polypropylene compositions of matter. Still more particularly, the present invention relates to polypropylene based fiber composites including a propylene based polymer, an organic fiber, and an inorganic filler.

BACKGROUND OF THE INVENTION

Polyolefins have limited use in engineering applications due to the tradeoff between toughness and stiffness. For example, polyethylene is widely regarded as being relatively tough, but low in stiffness. Polypropylene generally displays the opposite trend, i.e., is relatively stiff, but low in toughness.

Several well known polypropylene compositions have been introduced which address toughness. For example, it is known to increase the toughness of polypropylene by adding rubber particles, either in-reactor resulting in impact copolymers, or through post-reactor blending. However, while toughness is improved, the stiffness is considerably reduced using this approach.

Glass reinforced polypropylene compositions have been introduced to improve stiffness. However, the glass fibers have a tendency to break in typical injection molding equipment, resulting in reduced toughness and stiffness. In addition, glass reinforced products have a tendency to warp after injection molding Another known method of improving physical properties of polyolefins is organic fiber reinforcement. For example, EP Patent Application 0397881, the entire disclosure of which is hereby incorporated herein by reference, discloses a composition produced by melt-mixing 100 parts by weight of a polypropylene resin and 10 to 100 parts by weight of polyester fibers having a fiber diameter of 1 to 10 deniers, a fiber length of 0.5 to 50 mm and a fiber strength of 5 to 13 g/d, and then molding the resulting mixture. Also, U.S. Pat. No. 3,639,424 to Gray, Jr. et al., the entire disclosure of which is hereby incorporated herein by reference, discloses a composition including a polymer, such as polypropylene, and uniformly dispersed therein at least about 10% by weight of the composition staple length fiber, the fiber being of man-made polymers, such as poly(ethylene terephthalate) or poly(1,4-cyclohexylenedimethylene terephthalate).

Fiber reinforced polypropylene compositions are also disclosed in PCT Publication WO02/053629, the entire disclosure of which is hereby incorporated herein by reference. More specifically, WO02/053629 discloses a polymeric compound, comprising a thermoplastic matrix having a high flow during melt processing and polymeric fibers having lengths of from 0.1 mm to 50 mm. The polymeric compound comprises between 0.5 wt % and 10 wt % of a lubricant.

Various modifications to organic fiber reinforced polypropylene compositions are also known. For example, polyolefins modified with maleic anhydride or acrylic acid have been used as the matrix component to improve the interface strength between the synthetic organic fiber and the polyolefin, which was thought to enhance the mechanical properties of the molded product made therefrom.

Other background references include PCT Publication WO90/05164; EP Patent Application 0669372; U.S. Pat. No. 6,395,342 to Kadowaki et al.; EP Patent Application 1075918; U.S. Pat. No. 5,145,891 to Yasukawa et al., U.S. Pat. No. 5,145,892 to Yasukawa et al.; and EP Patent 0232522, the entire disclosures of which are hereby incorporated herein by reference.

A need exists of an improved polypropylene based fiber composite that yields a combination of improved impact resistance/toughness, and stiffness for use in molded articles at favorable raw material and manufacturing costs. In addition, the polypropylene-fiber compositions when formed into molded articles will ideally not splinter after subjected to break through drop weight impact testing.

SUMMARY OF THE INVENTION

It has surprisingly been found that substantially lubricant-free fiber reinforced polypropylene compositions can be made which simultaneously have a flexural modulus of at least 300,000 psi and exhibit ductility during instrumented impact testing. Particularly surprising is the ability to make such compositions using a wide range of polypropylenes as the matrix material, including some polypropylenes that without fiber are very brittle. The compositions of the present invention are particularly suitable for making articles including, but not limited to household appliances, automotive parts, and boat hulls.

In one embodiment, the present invention provides an article of manufacture made from a composition comprising, based on the total weight of the composition, at least 30 wt % polypropylene, from 10 to 60 wt % organic fiber, from 0 to 40 wt % inorganic filler, and from 0 to 0.1 wt % lubricant. The composition has a flexural modulus of at least 300,000 psi and exhibits ductility during instrumented impact testing (15 mph, −29° C., 25 lbs). In another embodiment, the fiber reinforced polypropylene composite with an inorganic filler further includes from 0.01 to 0.1 wt % lubricant. Suitable lubricants include, but are not limited to, silicon oil, silicon gum, fatty amide, paraffin oil, paraffin wax, and ester oil. In another embodiment, the present invention provides an automotive part made from such composition.

In another embodiment, the present invention provides an article of manufacture made from a composition consisting essentially of at least 30 wt % homopolypropylene, from 10 to 60 wt % organic fiber, and from 0.1 to 40 wt % inorganic filler, based on the total weight of the composition. The composition has a flexural modulus of at least 300,000 psi and exhibits ductility during instrumented impact testing (15 mph, −25° C., 25 lbs).

In yet another embodiment, the present invention provides a process for making an automotive part. The process comprises extrusion compounding a composition to form an extrudate and injection molding the extrudate to form the automotive part. The composition used to form the extrudate comprises at least 30 wt % polypropylene, from 10 to 60 wt % organic fiber, from 0 to 40 wt % inorganic filler, and from 0 to 0.1 wt % lubricant. The composition has a flexural modulus of at least 300,000 psi and exhibits ductility during instrumented impact testing (15 mph, −29° C., 25 lbs).

In yet another embodiment of the present disclosure provides an advantageous polypropylene resin composition comprising at least 30 wt %, based on the total weight of the composition, polypropylene based polymer; from 10 to 60 wt %, based on the total weight of the composition, organic fiber; and from 0 to 40 wt %, based on the total weight of the composition, inorganic filler; wherein an article molded from said composition has a flexural modulus of at least 300,000 psi and exhibits ductility during instrumented impact testing (15 mph, −29° C., 25 lbs).

In yet another embodiment of the present disclosure provides an advantageous polypropylene resin composition comprising at least 25 wt %, based on the total weight of the composition, polypropylene based polymer with a melt flow rate of from about 20 to about 1500 g/10 minutes; from 5 to 40 wt %, based on the total weight of the composition, organic fiber; and from 10 to 60 wt %, based on the total weight of the composition, inorganic filler; wherein an article molded from said composition has a flexural modulus of at least about 300,000 psi and exhibits ductility during instrumented impact testing (15 mph, −29° C., 25 lbs).

In yet another embodiment of the present disclosure provides an advantageous polypropylene resin composition comprising at least 30 wt %, based on the total weight of the composition, polypropylene based polymer; from 5 to 40 wt %, based on the total weight of the composition, organic fiber; from 10 to 60 wt %, based on the total weight of the composition, inorganic filler; and from 0.01 to 0.1 wt %, based on the total weight of the composition, lubricant; wherein an article molded from said composition has a flexural modulus of at least about 300,000 psi and exhibits ductility during instrumented impact testing.

In yet another embodiment of the present disclosure provides an advantageous polypropylene resin composition comprising at least 25 wt %, based on the total weight of the composition, polypropylene based polymer, wherein said polypropylene based polymer has a melt flow rate of at least 80 g/10 minutes; from 5 to 15 wt %, based on the total weight of the composition, organic fiber; and from 50 to 60 wt %, based on the total weight of the composition, talc or wollastonite; wherein an article molded from said composition has a flexural modulus of at least about 750,000 psi and exhibits ductility during instrumented impact testing (15 mph, −29° C., 25 lbs).

In still yet another embodiment of the present disclosure provides an advantageous polypropylene resin composition comprising at least 40 wt %, based on the total weight of the composition, polypropylene based polymer, wherein said polypropylene based polymer has a melt flow rate of at least 100 g/10 minutes; from 10 to 30 wt %, based on the total weight of the composition, organic fiber; and from 10 to 30 wt %, based on the total weight of the composition, talc or wollastonite; wherein an article molded from said composition has a flexural modulus of at least about 325,000 psi and exhibits ductility during instrumented impact testing (15 mph, −29° C., 25 lbs).

Numerous advantages result from the advantageous polypropylene fiber composites, method of making disclosed herein and the uses/applications therefore.

For example, in exemplary embodiments of the present disclosure, the disclosed polypropylene fiber composites exhibit improved instrumented impact resistance.

In a further exemplary embodiment of the present disclosure, the disclosed polypropylene fiber composites exhibit improved flexural modulus.

In a further exemplary embodiment of the present disclosure, the disclosed polypropylene fiber composites do not splinter during instrumented impact testing.

In yet a further exemplary embodiment of the present disclosure, the disclosed polypropylene fiber composites exhibit fiber pull out during instrumented impact testing without the need for lubricant additives.

In yet a further exemplary embodiment of the present disclosure, the disclosed polypropylene fiber composites exhibit a higher heat distortion temperature compared to rubber toughened polypropylene.

In yet a further exemplary embodiment of the present disclosure, the disclosed polypropylene fiber composites exhibit a lower flow and cross flow coefficient of linear thermal expansion compared to rubber toughened polypropylene.

These and other advantages, features and attributes of the disclosed polypropylene fiber composites, and method of making of the present disclosure and their advantageous applications and/or uses will be apparent from the detailed description which follows, particularly when read in conjunction with the figures appended hereto.

DETAILED DESCRIPTION OF THE INVENTION

The present invention relates to improved fiber reinforced polypropylene compositions and method of making therein for use in molding applications. The fiber reinforced polypropylene compositions of the present invention are distinguishable over the prior art in comprising a combination of a polypropylene based matrix with organic fiber and inorganic filler, which in combination advantageously yield articles molded from the compositions with a flexural modulus of at least 300,000 psi and ductility during instrumented impact testing (15 mph, −29° C., 25 lbs). The fiber reinforced polypropylene compositions of the present invention are also distinguishable over the prior art in comprising a polypropylene based matrix polymer with an advantageous high melt flow rate without sacrificing impact resistance. In addition, fiber reinforced polypropylene compositions of the present invention do not splinter during instrumented impact testing.

The fiber reinforced polypropylene compositions of the present invention simultaneously have desirable stiffness, as measured by having a flexural modulus of at least 300,000 psi, and toughness, as measured by exhibiting ductility during instrumented impact testing. In a particular embodiment, the compositions have a flexural modulus of at least 350,000 psi, or at least 370,000 psi, or at least 390,000 psi, or at least 400,000 psi, or at least 450,000 psi. Still more particularly, the compositions have a flexural modulus of at least 600,000 psi, or at least 800,000 psi. It is also believed that having a weak interface between the polypropylene matrix and the fiber contributes to fiber pullout; and, therefore, may enhance toughness. Thus, there is no need to add modified polypropylenes to enhance bonding between the fiber and the polypropylene matrix, although the use of modified polypropylene may be advantageous to enhance the bonding between a filler such as talc or wollastonite and the matrix. In addition, in one embodiment, there is no need to add lubricant to weaken the interface between the polypropylene and the fiber to further enhance fiber pullout. Some embodiments also display no splintering during instrumented dart impact testing, which yield a further advantage of not subjecting a person in close proximity to the impact to potentially harmful splintered fragments.

Compositions of the present invention generally include at least 30 wt %, based on the total weight of the composition, of polypropylene as the matrix resin. In a particular embodiment, the polypropylene is present in an amount of at least 30 wt %, or at least 35 wt %, or at least 40 wt %, or at least 45 wt %, or at least 50 wt %, or in an amount within the range having a lower limit of 30 wt %, or 35 wt %, or 40 wt %, or 45 wt %, or 50 wt %, and an upper limit of 75 wt %, or 80 wt %, based on the total weight of the composition. In another embodiment, the polypropylene is present in an amount of at least 25 wt %.

The polypropylene used as the matrix resin is not particularly restricted and is generally selected from the group consisting of propylene homopolymers, propylene-ethylene random copolymers, propylene-α-olefin random copolymers, propylene block copolymers, propylene impact copolymers, and combinations thereof. In a particular embodiment, the polypropylene is a propylene homopolymer. In another particular embodiment, the polypropylene is a propylene impact copolymer comprising from 78 to 95 wt % homopolypropylene and from 5 to 22 wt % ethylene-propylene rubber, based on the total weight of the impact copolymer. In a particular aspect of this embodiment, the propylene impact copolymer comprises from 90 to 95 wt % homopolypropylene and from 5 to 10 wt % ethylene-propylene rubber, based on the total weight of the impact copolymer.

The polypropylene of the matrix resin may have a melt flow rate of from about 20 to about 1500 g/10 min. In a particular embodiment, the melt flow rate of the polypropylene matrix resin is greater 100 g/10 min, and still more particularly greater than or equal to 400 g/10 min. In yet another embodiment, the melt flow rate of the polypropylene matrix resin is about 1500 g/10 min. The higher melt flow rate permits for improvements in processability, throughput rates, and higher loading levels of organic fiber and inorganic filler without negatively impacting flexural modulus and impact resistance.

In a particular embodiment, the matrix polypropylene contains less than 0.1 wt % of a modifier, based on the total weight of the polypropylene. Typical modifiers include, for example, unsaturated carboxylic acids, such as acrylic acid, methacrylic acid, maleic acid, itaconic acid, fumaric acid or esters thereof, maleic anhydride, itaconic anhydride, and derivates thereof. In another particular embodiment, the matrix polypropylene does not contain a modifier. In still yet another particular embodiment, the polypropylene based polymer further includes from about 0.1 wt % to less than about 10 wt % of a polypropylene based polymer modified with a grafting agent. The grafting agent includes, but is not limited to, acrylic acid, methacrylic acid, maleic acid, itaconic acid, fumaric acid or esters thereof, maleic anhydride, itaconic anhydride, and combinations thereof.

The polypropylene may further contain additives commonly known in the art, such as dispersant, lubricant, flame-retardant, antioxidant, antistatic agent, light stabilizer, ultraviolet light absorber, carbon black, nucleating agent, plasticizer, and coloring agent such as dye or pigment. The amount of additive, if present, in the polypropylene matrix is generally from 0.5 wt %, or 2.5 wt %, to 7.5 wt %, or 10 wt %, based on the total weight of the matrix. Diffusion of additive(s) during processing may cause a portion of the additive(s) to be present in the fiber.

The invention is not limited by any particular polymerization method for producing the matrix polypropylene, and the polymerization processes described herein are not limited by any particular type of reaction vessel. For example, the matrix polypropylene can be produced using any of the well known processes of solution polymerization, slurry polymerization, bulk polymerization, gas phase polymerization, and combinations thereof. Furthermore, the invention is not limited to any particular catalyst for making the polypropylene, and may, for example, include Ziegler-Natta or metallocene catalysts.

Compositions of the present invention generally include at least 10 wt %, based on the total weight of the composition, of an organic fiber. In a particular embodiment, the fiber is present in an amount of at least 10 wt %, or at least 15 wt %, or at least 20 wt %, or in an amount within the range having a lower limit of 10 wt %, or 15 wt %, or 20 wt %, and an upper limit of 50 wt %, or 55 wt %, or 60 wt %, or 70 wt %, based on the total weight of the composition. In another embodiment, the organic fiber is present in an amount of at least 5 wt % and up to 40 wt %.

The polymer used as the fiber is not particularly restricted and is generally selected from the group consisting of polyalkylene terephthalates, polyalkylene naphthalates, polyamides, polyolefins, polyacrylonitrile, and combinations thereof. In a particular embodiment, the fiber comprises a polymer selected from the group consisting of polyethylene terephthalate (PET), polybutylene terephthalate, polyamide and acrylic. In another particular embodiment, the organic fiber comprises PET.

In one embodiment, the fiber is a single component fiber. In another embodiment, the fiber is a multicomponent fiber wherein the fiber is formed from a process wherein at least two polymers are extruded from separate extruders and melt-blown or spun together to form one fiber. In a particular aspect of this embodiment, the polymers used in the multicomponent fiber are substantially the same. In another particular aspect of this embodiment, the polymers used in the multicomponent fiber are different from each other. The configuration of the multicomponent fiber can be, for example, a sheath/core arrangement, a side-by-side arrangement, a pie arrangement, an islands-in-the-sea arrangement, or a variation thereof. The fiber may also be drawn to enhance mechanical properties via orientation, and subsequently annealed at elevated temperatures, but below the crystalline melting point to reduce shrinkage and improve dimensional stability at elevated temperature.

The length and diameter of the fibers of the present invention are not particularly restricted. In a particular embodiment, the fibers have a length of ¼ inch, or a length within the range having a lower limit of ⅛ inch, or ⅙ inch, and an upper limit of ⅓ inch, or ½ inch. In another particular embodiment, the diameter of the fibers is within the range having a lower limit of 10 μm and an upper limit of 100 μm.

The fiber may further contain additives commonly known in the art, such as dispersant, lubricant, flame-retardant, antioxidant, antistatic agent, light stabilizer, ultraviolet light absorber, carbon black, nucleating agent, plasticizer, and coloring agent such as dye or pigment.

The fiber used to make the compositions of the present invention is not limited by any particular fiber form. For example, the fiber can be in the form of continuous filament yarn, partially oriented yarn, or staple fiber. In another embodiment, the fiber may be a continuous multifilament fiber or a continuous monofilament fiber.

Compositions of the present invention optionally include inorganic filler in an amount of at least 1 wt %, or at least 5 wt %, or at least 10 wt %, or in an amount within the range having a lower limit of 0 wt %, or 1 wt %, or 5 wt %, or 10 wt %, or 15 wt %, and an upper limit of 25 wt %, or 30 wt %, or 35 wt %, or 40 wt %, based on the total weight of the composition. In yet another embodiment, the inorganic filler may be included in the polypropylene fiber composite in the range of from 10 wt % to about 60 wt %. In a particular embodiment, the inorganic filler is selected from the group consisting of talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, and combinations thereof. The talc may have a size of from about 1 to about 100 microns. In one particular embodiment, at a high talc loading of up to about 60 wt %, the polypropylene fiber composite exhibited a flexural modulus of at least about 750,000 psi and no splintering during instrumented impact testing (15 mph, −29° C., 25 lbs). In another particular embodiment, at a low talc loading of as low as 10 wt %, the polypropylene fiber composite exhibited a flexural modulus of at least about 325,000 psi and no splintering during instrumented impact testing (15 mph, −29° C., 25 lbs). In addition, wollastonite loadings of from 10 wt % to 60 wt % in the polypropylene fiber composite yielded an outstanding combination of impact resistance and stiffness.

In another particular embodiment, a fiber reinforced polypropylene composition including a polypropylene based resin with a melt flow rate of 80 to 1500, 10 to 15 wt % of polyester fiber, and 50 to 60 wt % of inorganic filler displayed a flexural modulus of 850,000 to 1,200,000 psi and did not shatter during instrumented impact testing at −29 degrees centigrade, tested at 25 pounds and 15 miles per hour. The inorganic filler includes, but is not limited to, talc and wollastonite. This combination of stiffness and toughness is difficult to achieve in a polymeric based material. In addition, the fiber reinforced polypropylene composition has a heat distortion temperature at 66 psi of 140 degrees centigrade, and a flow and cross flow coefficient of linear thermal expansion of $2.2 \times 10^{-5}$ and $3.3 \times 10^{-5}$ per degree centigrade respectively. In comparison, rubber toughened polypropylene has a heat distortion temperature of 94.6 degrees centigrade, and a flow and cross flow thermal expansion coefficient of $10 \times 10^{-5}$ and $18.6 \times 10^{-5}$ per degree centigrade respectively Articles of the present invention are made by forming the fiber-reinforced polypropylene composition and then injection molding the composition to form the article. The invention is not limited by any particular method for forming the compositions. For example, the compositions can be formed by contacting polypropylene, organic fiber, and optional inorganic filler in any of the well known processes of pultrusion or extrusion compounding. In a particular embodiment, the compositions are formed in an extrusion compounding process. In a particular aspect of this embodiment, the organic fibers are cut prior to being placed in the extruder hopper. In another particular aspect of this embodiment, the organic fibers are fed directly from one or more spools into the extruder hopper. Articles made from the compositions described herein include, but are not limited to automotive parts, household appliances, and boat hulls.

The present invention is further illustrated by means of the following examples, and the advantages thereto without limiting the scope thereof.

Test Methods.

Fiber reinforced polypropylene compositions described herein were injection molded at 2300 psi pressure, 401° C. at all heating zones as well as the nozzle, with a mold temperature of 60° C.

Flexural modulus data was generated for injected molded samples produced from the fiber reinforced polypropylene compositions described herein using the ISO 178 standard procedure.

Instrumented impact test data was generated for injected mold samples produced from the fiber reinforced polypropylene compositions described herein using ASTM D3763. Ductility during instrumented impact testing (test conditions of 15 mph, −29° C., 25 lbs) is defined as no splintering of the sample.

EXAMPLES

PP3505G is a propylene homopolymer commercially available from ExxonMobil Chemical Company of Baytown, Tex. The MFR (2.16 kg, 230° C.) of PP3505G was measured according to ASTM D1238 to be 400 g/10 min.

PP7805 is an 80 MFR propylene impact copolymer commercially available from ExxonMobil Chemical Company of Baytown, Tex.

PP8114 is a 22 MFR propylene impact copolymer containing ethylene-propylene rubber and a plastomer, and is commercially available from ExxonMobil Chemical Company of Baytown, Tex.

PP8224 is a 25 MFR propylene impact copolymer containing ethylene-propylene rubber and a plastomer, and is commercially available from ExxonMobil Chemical Company of Baytown, Tex.

PO1020 is 430 MFR maleic anhydride functionalized polypropylene homopolymer containing 0.5-1.0 weight percent maleic anhydride.

Cimpact CB7 is a surface modified talc and V3837 is a high aspect ratio talc, both available from Luzenac America Inc. of Englewood, Colo.

Illustrative Examples 1-8

Varying amounts of PP3505G and 0.25" long polyester fibers obtained from Invista Corporation were mixed in a Haake single screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for instrumented impact under standard automotive conditions for interior parts (25 lbs, at 15 MPH, at −29° C). The total energy absorbed and impact results are given in Table 1.

TABLE 1

| Example # | wt % PP3505G | wt % Fiber | Total Energy (ft-lbf) | Instrumented Impact Test Results |
|---|---|---|---|---|
| 1 | 65 | 35 | 8.6 ± 1.1 | ductile* |
| 2 | 70 | 30 | 9.3 ± 0.6 | ductile* |
| 3 | 75 | 25 | 6.2 ± 1.2 | ductile* |
| 4 | 80 | 20 | 5.1 ± 1.2 | ductile* |
| 5 | 85 | 15 | 3.0 ± 0.3 | ductile* |
| 6 | 90 | 10 | 2.1 ± 0.2 | ductile* |
| 7 | 95 | 5 | 0.4 ± 0.1 | brittle** |
| 8 | 100 | 0 | <0.1 | brittle*** |

*Examples 1-6: samples did not shatter or split as a result of impact, with no pieces coming off of the specimen.
**Example 7: pieces broke off of the sample as a result of the impact
***Example 8: samples completely shattered as a result of impact.

Illustrative Examples 9-14

In Examples 9-11, 35 wt % PP7805, 20 wt % Cimpact CB7 talc, and 45 wt % 25" long polyester fibers obtained from Invista Corporation, were mixed in a Haake twin screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for instrumented impact. The total energy absorbed and impact results are given in Table 2.

In Examples 12-14, PP8114 was extruded and injection molded under the same conditions as those for Examples 9-11. The total energy absorbed and impact results are given in Table 2.

TABLE 2

| Example # | Impact Conditions/Applied Energy | Total Energy (ft-lbf) | Instrumented Impact Test Results |
|---|---|---|---|
| 35 wt % PP7805 (70 MFR), 20 wt % talc, 45 wt % fiber | | | |
| 9 | −29° C., 15 MPH, 25 lbs/192 ft-lbf | 16.5 | ductile* |
| 10 | −29° C., 28 MPH, 25 lbs/653 ft-lbf | 14.2 | ductile* |
| 11 | −29° C., 21 MPH, 58 lbs/780 ft-lbf | 15.6 | ductile* |
| 100 wt % PP8114 (22 MFR) | | | |
| 12 | −29° C., 15 MPH, 25 lbs/192 ft-lbf | 32.2 | ductile* |
| 13 | −29° C., 28 MPH, 25 lbs/653 ft-lbf | 2.0 | brittle** |
| 14 | −29° C., 21 MPH, 58 lbs/780 ft-lbf | 1.7 | brittle** |

*Examples 9-12: samples did not shatter or split as a result of impact, with no pieces coming off of the specimen.
**Examples 13-14: samples shattered as a result of impact.

Illustrative Examples 15-16

A Leistritz ZSE27 HP-60D 27 mm twin screw extruder with a length to diameter ratio of 40:1 was fitted with six pairs of kneading elements 12" from the die exit. The die was ¼" in diameter. Strands of continuous 27,300 denier PET fibers were fed directly from spools into the hopper of the extruder, along with PP7805 and talc. The kneading elements in the extruder broke up the fiber in situ. The extruder speed was 400 revolutions per minute, and the temperatures across the extruder were held at 190° C. Injection molding was done under conditions similar to those described for Examples 1-14. The mechanical and physical properties of the sample were measured and are compared in Table 3 with the mechanical and physical properties of PP8224.

The instrumented impact test showed that in both examples there was no evidence of splitting or shattering, with no pieces coming off the specimen. In the notched charpy test, the PET fiber-reinforced PP7805 specimen was only partially broken, and the PP8224 specimen broke completely.

TABLE 3

| Test (Method) | Example 15 PET fiber-reinforced PP7805 with talc | Example 16 PP8224 |
| --- | --- | --- |
| Flexural Modulus, Chord (ISO 178) | 525,190 psi | 159,645 psi |
| Instrumented Impact at −30° C. Energy to maximum load 100 lbs at 5 MPH (ASTM D3763) | 6.8 J | 27.5 J |
| Notched Charpy Impact at −40° C. (ISO 179/1eA) | 52.4 kJ/m² | 5.0 kJ/m² |
| Heat Deflection Temperature at 0.45 Mpa, edgewise (ISO 75) | 116.5° C. | 97.6° C. |
| Coefficient of Linear Thermal Expansion, −30° C. to 100° C., Flow/Crossflow (ASTM E831) | 2.2/12.8 (E-5/° C.) | 10.0/18.6 (E-5/° C.) |

Illustrative Examples 17-18

In Examples 17-18, 30 wt % of either PP3505G or PP8224, 15 wt % 0.25" long polyester fibers obtained from Invista Corporation, and 45 wt % V3837 talc were mixed in a Haake twin screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for flexural modulus. The flexural modulus results are given in Table 4.

TABLE 4

| Example | Polypropylene, | Flexural Modulus, Chord, psi (ISO 178) | Instrumented Impact at −30° C. Energy to maximum load 25 lbs at 15 MPH (ASTM D3763), ft-lb |
| --- | --- | --- | --- |
| 17 | PP8224 | 433840 | 2 |
| 18 | PP3505 | 622195 | 2.9 |

The rubber toughened PP8114 matrix with PET fibers and talc displayed lower impact values than the PP3505 homopolymer. This result is surprising, because the rubber toughened matrix alone is far tougher than the low molecular weight PP3505 homopolymer alone at all temperatures under any conditions of impact. In both examples above, the materials displayed no splintering.

Illustrative Examples 19-24

In Examples 19-24, 25-75 wt % PP3505G, 15 wt % 0.25" long polyester fibers obtained from Invista Corporation, and 10-60 wt % V3837 talc were mixed in a Haake twin screw extruder at 175° C. The strand that exited the extruder was cut into 0.5" lengths and injection molded using a Boy 50M ton injection molder at 205° C. into a mold held at 60° C. Injection pressures and nozzle pressures were maintained at 2300 psi. Samples were molded in accordance with the geometry of ASTM D3763 and tested for flexural modulus. The flexural modulus results are given in Table 5.

TABLE 5

| Example | Talc Composition, | Flexural Modulus, Chord, psi (ISO 178) |
| --- | --- | --- |
| 19 | 10% | 273024 |
| 20 | 20% | 413471 |
| 21 | 30% | 583963 |
| 22 | 40% | 715005 |
| 23 | 50% | 1024394 |
| 24 | 60% | 1117249 |

It is important to note that in examples 19-24, the samples displayed no splintering in drop weight testing at an −29 C, 15 miles per hour at 25 pounds.

Illustrative Examples 25-26

Two materials, one containing 10% ¼ inch polyester fibers, 35% PP3505 polypropylene and 60% V3837 talc (example 25), the other containing 10% ¼ inch polyester fibers, 25% PP3505 polypropylene homopolymer (example 26), 10% PO1020 modified polypropylene were molded in a Haake twin screw extruder at 175° C. They were injection molded into standard ASTM A370 ½ inch wide sheet type tensile specimens. The specimens were tested in tension, with a ratio of minimum to maximum load of 0.1, at flexural stresses of 70 and 80% of the maximum stress.

TABLE 6

| Percentage of Maximum Stress to Yield Point | Example 25, Cycles to failure | Example 26, Cycles to failure |
| --- | --- | --- |
| 70 | 327 | 9848 |
| 80 | 30 | 63 |

The addition of the modified polypropylene is shown to increase the fatigue life of these materials All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention,

What is claimed is:

1. A polypropylene resin composition comprising:
   (a) at least 30 wt %, based on the total weight of the composition, polypropylene based polymer, wherein said polypropylene based polymer has a melt flow rate of at least 400 g/10 minutes;
   (b) from 10 to 15 wt %, based on the total weight of the composition, pre-cut organic fiber chosen from polyalkylene terephalates, polyalkylene naphthalates and combinations thereof; and
   (c) from 5 to 40 wt %, based on the total weight of the composition, inorganic filler;
   wherein said composition is substantially lubricant-free;
   wherein an article molded from said composition has a flexural modulus of at least 300,000 psi and exhibits ductility during instrumented impact testing.

2. The polypropylene resin composition of claim 1 wherein said polypropylene based polymer is selected from the group consisting of polypropylene homopolymers, propylene-ethylene random copolymers, propylene-α-olefin random copolymers, propylene impact copolymers, and combinations thereof.

3. The polypropylene resin composition of claim 2 wherein said polypropylene based polymer is polypropylene homopolymer.

4. The polypropylene resin composition of claim 1 wherein said polypropylene based polymer further comprises from about 0.01 wt % to less than about 0.1 wt % of a modifier selected from the group consisting of acrylic acid, methacrylic acid, maleic acid, itaconic acid, fumaric acid or esters thereof, maleic anhydride, itaconic anhydride, and combinations thereof.

5. The polypropylene resin composition of claim 1 wherein said organic fiber is dispersed randomly within said polypropylene based polymer.

6. The polypropylene resin composition of claim 5 wherein said organic fiber is a polyalkylene tereplithalate.

7. The polypropylene resin composition of claim 6 wherein said organic fiber is polyethylene terephthalate.

8. The polypropylene resin composition of claim 1 wherein said inorganic filler is selected from group consisting of talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, and combinations thereof.

9. The polypropylene resin composition of claim 8 wherein said inorganic filler is talc or wollastonite.

10. The polypropylene resin composition of claim 1 wherein said article molded from said composition has a flexural modulus of at least 450,000 psi.

11. A polypropylene resin composition comprising:
    (a) at least 25 wt %, based on the total weight of the composition, polypropylene based polymer with a melt flow rate of at least 400 g/10 minutes;
    (b) from 5 to 15 wt %, based on the total weight of the composition, pre-cut organic fiber chosen from polyalkylene terephalates, polyalkylene naplithalates and combinations thereof; and
    (c) from 10 to 60 wt %, based on the total weight of the composition, inorganic filler;
    wherein said composition is substantially lubricant free;
    wherein an article molded from said composition has a flexural modulus of at least about 300,000 psi and exhibits ductility during instrumented impact testing.

12. The polypropylene resin composition of claim 11 wherein said polypropylene based polymer is selected from the group consisting of polypropylene homopolymers, propylene-ethylene random copolymers, propylene-β-olefin random copolymers, propylene impact copolymers, and combinations thereof.

13. The polypropylene resin composition of claim 12 wherein said polypropylene based polymer is polypropylene homopolymer with a melt flow rate of about 1500 g/10 minutes.

14. The polypropylene resin composition of claim 11 wherein said polypropylene based polymer further comprises from about 0.1 wt % to less than about 10 wt % of a polypropylene based polymer modified with a grafting agent, wherein said grafting agent is selected from the group consisting of acrylic acid, methacrylic acid, maleic acid, itaconic acid, fumaric acid or esters thereof, maleic anhydride, itaconic anhydride, and combinations thereof 15. The polypropylene resin composition of claim 11 wherein said organic fiber is dispersed randomly within said polypropylene based polymer.

16. The polypropylene resin composition of claim 15 wherein said organic fiber is a polyalkylene terephthalate.

17. The polypropylene resin composition of claim 16 wherein said organic fiber is polyethylene terephthalate at a loading from about 7.5% to about 15 wt %.

18. The polypropylene resin composition of claim 11 wherein said inorganic filler is selected from group consisting of talc, calcium carbonate, calcium hydroxide, barium sulfate, mica, calcium silicate, clay, kaolin, silica, alumina, wollastonite, magnesium carbonate, magnesium hydroxide, titanium oxide, zinc oxide, zinc sulfate, and combinations thereof.

19. The polypropylene resin composition of claim 18 wherein said inorganic filler is talc or wollastonite at a loading from about 20% to about 60 wt %.

20. The polypropylene resin composition of claim 19 wherein the size of said talc is from about 1 to about 100 microns.

21. The propylene resin composition of claim 11 wherein said article molded from said composition has a flexural modulus of at least about 600,000 psi.

22. The propylene resin composition of claim 11 wherein said article molded from said composition has a flexural modulus of at least about 1,000,000 psi.

23. A polypropylene resin composition comprising:
    (a) at least 30 wt %, based on the total weight of the composition, polypropylene based polymer, wherein said polypropylene based polymer has a melt flow rate of at least 400 g/10 minutes;
    (b) from 5 to 15 wt %, based on the total weight of the composition, pre-cut organic fiber chosen from polyalkylene terephalates, polyalkylene naphthalates and combinations thereof;
    (c) from 10 to 60 wt %, based on the total weight of the composition, inorganic filler, and (d) from 0.01 to 0.1 wt %, based on the total weight of the composition, modifier;
    wherein said composition is substantially lubricant free;
    wherein an article molded from said composition has a flexural modulus of at least about 300,000 psi and exhibits ductility during instrumented impact testing.

24. The polypropylene resin composition of claim 23 wherein said modifier is selected from the group consisting of acrylic acid, methacrylic acid, maleic acid, itaconic acid, fumaric acid or esters thereof, maleic anhydride, itaconic anhydride, and combinations thereof.

25. The polypropylene resin composition of claim 23 wherein said polypropylene based polymer is polypropylene homopolymer.

26. The polypropylene resin composition of claim 23 wherein said organic fiber is dispersed randomly within said polypropylene based polymer.

27. The polypropylene resin composition of claim 26 wherein said organic fiber is polyethylene terephthalate.

28. The polypropylene resin composition of claim 27 wherein said inorganic filler is talc or wollastonite.

29. A polypropylene resin composition comprising:
  (a) at least 25 wt %, based on the total weight of the composition, polypropylene based polymer, wherein said polypropylene based polymer has a melt flow rate of at least 400 g/10 minutes;
  (b) from 5 to 15 wt %, based on the total weight of the composition, pre-cut organic fiber chosen from polyalkylene terephalates, polyalkylene naphthalates and combinations thereof; and
  (c) from 50 to 60 wt %, based on the total weight of the composition, talc or wollastonite;

wherein said composition is substantially lubricant free; wherein an article molded from said composition has a flexural modulus of at least about 750,000 psi and exhibits ductility during instrumented impact testing.

30. The polypropylene resin composition of claim 29 wherein said polypropylene based polymer is selected from the group consisting of polypropylene homopolymers. propylene-ethylene random copolymers, propylene-β-olefin random copolymers. propylene impact copolymers, and combinations thereof.

31. The polypropylene resin composition of claim 30 wherein said polypropylene based polymer is polypropylene homopolymer with a melt flow rate of about 1500 g/10 minutes.

32. The polypropylene resin composition of claim 29 wherein said polypropylene based polymer further comprises from about 0.1 wt % to less than about 10 wt % of a polypropylene based polymer modified with a grafting agent, wherein said grafting agent is selected from the group consisting of acrylic acid, methacrylic acid, maleic acid, itaconic acid, fumaric acid or esters thereof, maleic anhydride, itaconic anhydride, and combinations thereof.

33. The polypropylene resin composition of claim 29 wherein said organic fiber is dispersed randomly within said polypropylene based polymer.

34. The polypropylene resin composition of claim 33 wherein said organic fiber is a polyalkylene terephthalate.

35. The polypropylene resin composition of claim 34 wherein said organic fiber is polyethylene terephthalate.

36. The polypropylene resin composition of claim 35 wherein, the size of said talc is from 1 to about 100 microns.

37. The polypropylene resin composition of claim 36 wherein said article molded from said composition has a flexural modulus of at least about 1,000,000 psi.

38. A polypropylene resin composition comprising:
  (a) at least 40 wt %, based on the total weight of the composition, polypropylene based polymer, wherein said polypropylene based polymer has a melt flow rate of at least 400 g/10 minutes;
  (b) from 10 to 15 wt %, based on the total weight of the composition, pre-cut organic fiber chosen from polyalkylene terephalates, polyalkylene naphthalates and combinations thereof; and (c) from 10 to 30 wt %, based on the total weight of the composition, talc or wollastonite wherein said composition is substantially lubricant free; wherein an article molded from said composition has a flexural modulus of at least about 325,000 psi and exhibits ductility during instrumented impact testing.

39. The polypropylene resin composition of claim 38 wherein said polypropylene based polymer is selected. from the group consisting of polypropylene homopolymers, propylene-ethylene random copolymers, propylene-β-olefin random copolymers, propylene impact copolymers, and combinations thereof.

40. The polypropylene resin composition of claim 39 wherein said polypropylene based polymer is polypropylene homopolymer with a melt flow rate of about 1500 g/10 minutes.

41. The polypropylene resin composition of claim 38 wherein said polypropylene based polymer further comprises from about 0.1 wt % to less than about 10 wt % of a polypropylene based polymer modified with a grafting agent, wherein said grafting agent is selected from the group consisting of acrylic acid, methacrylic acid, maleic acid, itaconic acid, fumaric acid or esters thereof, maleic anhydride, itaconic anhydride, and combinations thereof.

42. The polypropylene resin composition of claim 38 wherein said organic fiber is dispersed randomly within said polypropylene based polymer.

43. The polypropylene resin composition of claim 42 wherein said organic fiber is a polyalkylene terephthalate.

44. The polypropylene resin composition of claim 43 wherein said organic fiber is polyethylene terephthalate.

45. The polypropylene resin composition of claim 44 wherein the size of said talc is from about 1 to about 100 microns.

46. The polypropylene resin composition of claim 45 wherein said article molded from said composition has a flexural modulus of at least about 375,000 psi.

* * * * *